(12) United States Patent
Kourtoff

(10) Patent No.: US 12,292,035 B1
(45) Date of Patent: May 6, 2025

(54) WIND TURBINE SYSTEM FOR POWER GENERATION

(71) Applicant: PURUS POWER CORPORATION, Brampton (CA)

(72) Inventor: John Michael Kourtoff, Toronto (CA)

(73) Assignee: PURUS POWER CORPORATION, Brampton (CA)

( * ) Notice: Subject to any disclaimer, the term of this patent is extended or adjusted under 35 U.S.C. 154(b) by 0 days.

(21) Appl. No.: 18/896,322

(22) Filed: Sep. 25, 2024

(51) Int. Cl.
| | |
|---|---|
| *F03D 9/25* | (2016.01) |
| *F03D 1/04* | (2006.01) |
| *F03D 1/06* | (2006.01) |
| *H02K 7/18* | (2006.01) |

(52) U.S. Cl.
CPC ............... *F03D 9/25* (2016.05); *F03D 1/04* (2013.01); *F03D 1/06* (2013.01); *H02K 7/183* (2013.01); *F05B 2220/706* (2013.01); *F05B 2250/70* (2013.01)

(58) Field of Classification Search
CPC .... F03D 9/25; F03D 1/04; F03D 1/06; H02K 7/183; F05B 2220/706; F05B 2250/70
See application file for complete search history.

(56) References Cited

U.S. PATENT DOCUMENTS

| | | |
|---|---|---|
| 1,345,022 A | 6/1920 | Oliver |
| 1,646,723 A | 10/1927 | Bonetto |
| 3,934,923 A | 1/1976 | Lissaman et al. |
| 4,076,448 A | 2/1978 | Sanders, Jr. |

(Continued)

FOREIGN PATENT DOCUMENTS

| | | |
|---|---|---|
| CA | 3092026 A1 | 8/2020 |
| CA | 3060653 A1 | 4/2021 |

(Continued)

OTHER PUBLICATIONS

Cho S-Y, "An experimental study of the optimal design parameters of a wind power tower used to improve the performance of vertical axis wind turbines." Advances in Mechanical Engineering. 2018; 10(9). doi:10.1177/1687814018799543, 10 pages.

(Continued)

*Primary Examiner* — Viet P Nguyen
(74) *Attorney, Agent, or Firm* — SMART & BIGGAR LP

(57) ABSTRACT

A wind turbine system is disclosed. The wind turbine system includes a flow consolidating conduit and an air driven rotor assembly. The air driven rotor assembly includes a rotor housing, a rotor within the rotor housing, and an annular pre-rotor flow recirculation passage defined between the rotor housing and the rotor. The rotor has a plurality of air driven blades distributed around a rotor rotation axis. The rotor has a radially inward entry direction. The recirculation passage surrounds the rotor. The recirculation passage extends from a recirculation passage upstream end to a recirculation passage downstream end. The recirculation passage downstream end is open ended and provides fluid continuity from the recirculation passage downstream end to the recirculation passage upstream end. The recirculation passage has a passage cross-sectional area that decreases gradually from the recirculation passage upstream end to the recirculation passage downstream end.

17 Claims, 9 Drawing Sheets

(56) References Cited

U.S. PATENT DOCUMENTS

| | | | |
|---|---|---|---|
| 4,084,918 | A | 4/1978 | Pavlecka |
| 4,168,759 | A | 9/1979 | Hull et al. |
| 4,227,855 | A | 10/1980 | Flynn et al. |
| 4,359,311 | A | 11/1982 | Benesh |
| 4,512,714 | A | 4/1985 | Kaesser |
| 5,083,899 | A * | 1/1992 | Koch .................... F03D 3/049 |
| | | | 415/4.2 |
| 5,977,649 | A | 11/1999 | Dahill |
| 6,465,899 | B2 | 10/2002 | Roberts |
| 6,638,005 | B2 | 10/2003 | Holter et al. |
| 6,838,782 | B2 | 1/2005 | Vu |
| 6,849,964 | B2 | 2/2005 | Becherucci et al. |
| 6,857,492 | B1 | 2/2005 | Liskey et al. |
| 7,329,965 | B2 | 2/2008 | Roberts et al. |
| 7,695,050 | B2 | 4/2010 | Neale |
| 8,197,178 | B1 | 6/2012 | Chen |
| 8,360,713 | B2 | 1/2013 | Carosi et al. |
| 8,362,636 | B2 | 1/2013 | Ling |
| 8,556,571 | B2 * | 10/2013 | Cassidy ................ F03D 1/0608 |
| | | | 415/55.1 |
| 8,618,683 | B2 | 12/2013 | Diaz |
| 8,864,455 | B2 * | 10/2014 | Perry .................... F03D 15/10 |
| | | | 415/205 |
| 8,907,511 | B2 | 12/2014 | Bowyer et al. |
| 8,961,103 | B1 | 2/2015 | Wolff |
| 9,371,818 | B1 | 6/2016 | Monto |
| 9,573,697 | B2 | 2/2017 | Criado et al. |
| 9,744,927 | B2 | 8/2017 | Karimirozbahani |
| 9,863,403 | B2 | 1/2018 | Gaither |
| 9,926,912 | B2 | 3/2018 | Deshpande et al. |
| 10,767,631 | B2 | 9/2020 | Ouchi |
| 11,124,063 | B2 | 9/2021 | Albrecht |
| 11,187,207 | B1 | 11/2021 | Perkins |
| 11,215,160 | B2 | 1/2022 | Huang et al. |
| 11,230,329 | B1 | 1/2022 | White |
| 11,286,907 | B1 | 3/2022 | Rebek |
| 11,434,870 | B2 | 9/2022 | Suma et al. |
| 11,767,090 | B2 | 9/2023 | Mundon et al. |
| 2005/0230980 | A1 | 10/2005 | Brunet |
| 2010/0001532 | A1 | 1/2010 | Grumazescu |
| 2011/0027084 | A1 | 2/2011 | Rekret |
| 2011/0033288 | A1 | 2/2011 | Pezaris |
| 2011/0037261 | A1 | 2/2011 | Champ et al. |
| 2011/0204634 | A1 | 8/2011 | Skala |
| 2011/0291420 | A1 | 12/2011 | Gu |
| 2012/0056428 | A1 | 3/2012 | Bennett et al. |
| 2013/0064660 | A1 | 3/2013 | Hong |
| 2017/0342964 | A1 | 11/2017 | Cianflone |
| 2020/0055403 | A1 | 2/2020 | Overstreet |
| 2021/0062789 | A1 | 3/2021 | Parker |
| 2021/0122249 | A1 | 4/2021 | Maury et al. |
| 2021/0138910 | A1 | 5/2021 | Estefan Bellan et al. |
| 2022/0355673 | A1 | 11/2022 | Balakrishnan |
| 2022/0409454 | A1 | 12/2022 | Bekoscke et al. |
| 2023/0339332 | A1 | 10/2023 | Maury et al. |

FOREIGN PATENT DOCUMENTS

| | | | | |
|---|---|---|---|---|
| CN | 104389741 | A | 3/2015 | |
| DE | 3829112 | A1 | 3/1990 | |
| DE | 19648632 | A1 | 4/1998 | |
| DE | 102005041600 | B3 | 12/2006 | |
| DE | 202009001926 | U1 | 6/2010 | |
| DE | 102015002670 | A1 | 9/2016 | |
| EP | 3786445 | A1 | 3/2021 | |
| EP | 4273394 | A1 | 11/2023 | |
| WO | WO-2011091476 | A1 * | 8/2011 | ............... F03D 1/04 |
| WO | 2013041632 | A2 | 3/2013 | |
| WO | 2023020866 | A1 | 2/2023 | |

OTHER PUBLICATIONS

Schlueter-Kuck KL, "Coherent structure colouring: identification of coherent structures from sparse data using graph theory." Journal of Fluid Mechanics. 2017; 811: pp. 468-486. doi:10.1017/jfm.2016.755.

Schmid, Peter J. "Chapter Six—Data-driven and operator-based tools for the analysis of turbulent flows," Editor(s): Paul Durbin, Advanced Approaches in Turbulence, Elsevier, 2021, pp. 243-305, ISBN 9780128207741, doi:10.1016/B978-0-12-820774-1.00012-4.

Inhabitat, "The Maglev: The Super-powered Magnetic Wind Turbine," by Inhabitat, Nov. 26, 2007. Available online: https://inhabitat.com/super-powered-magnetic-wind-turbine-maglev/, 3 pages.

CIP0, "International Search Report and Written Opinion," mailed Dec. 17, 2024, PCT Application No. PCT/CA2024/050826, 11 pages.

* cited by examiner

WIND TURBINE SYSTEM FOR POWER GENERATION

FIELD

This application relates generally to the field of wind turbines, and more specifically to wind turbine systems for power generation.

INTRODUCTION

Energy generation is a significant contributor to global greenhouse gas emissions. Wind power is considered a sustainable, renewable energy source, and has a much smaller impact on the environment compared with burning fossil fuels. Wind turbines can help reduce global greenhouse gas emissions by utilizing wind energy for electricity generation. The efficiency of a wind turbine refers to the effectiveness of the wind turbine in converting kinetic energy of wind into mechanical energy, which can then be extracted by an electrical generator. Improvements in the efficiency of wind turbines can provide greater electricity generation and/or reduction in cost per unit of generated electricity. This can enable greater reductions in global greenhouse gas emissions.

SUMMARY

The following is intended to introduce the reader to the detailed description that follows and not to define or limit the claimed subject matter.

In one aspect, a wind turbine system is disclosed. The wind turbine system includes a flow consolidating conduit and an air driven rotor assembly. The flow consolidating conduit is close sided and extends from a consolidating conduit upstream end to a consolidating conduit downstream end. The flow consolidating conduit includes an airflow capture inlet at the consolidating conduit upstream end, and a plurality of flow partitions that subdivide a cross-sectional area of the flow consolidating conduit into three or more flow paths. Each flow partition and each flow path extend between the consolidating conduit upstream end and the consolidating conduit downstream end. Each flow partition has a partition downstream end located upstream of the consolidating conduit downstream end. At each partition downstream end, adjacent flow paths merge into a merged flow path. The three or more flow paths gradually merge into a single flow path at the consolidating conduit downstream end. Each flow partition has a partition length, the partition length of each flow partition being different from the partition length of at least one other flow partition. The cross-sectional area of the flow consolidating conduit decreases between the consolidating conduit upstream end and the consolidating conduit downstream end toward the consolidating conduit downstream end. The air driven rotor assembly has a rotor assembly upstream end located downstream of the consolidating conduit downstream end. The air driven rotor assembly includes an air driven rotor.

In another aspect, a wind turbine system is disclosed. The wind turbine system includes a flow consolidating conduit and an air driven rotor assembly. The flow consolidating conduit is close sided and extends from a consolidating conduit upstream end to a consolidating conduit downstream end. The flow consolidating conduit has a conduit length. The flow consolidating conduit includes an airflow capture inlet at the consolidating conduit upstream end, and a plurality of flow partitions that subdivide a cross-sectional area of the flow consolidating conduit into three or more flow paths. Each flow partition and each flow path extend between the consolidating conduit upstream end and the consolidating conduit downstream end. Each flow partition has a partition downstream end located upstream of the consolidating conduit downstream end. At each partition downstream end, adjacent flow paths merge into a merged flow path. The three or more flow paths gradually merge into a single flow path at the consolidating conduit downstream end. Each partition downstream end has a conduit-length position that is different from at least one other partition downstream end. The cross-sectional area of the flow consolidating conduit decreases between the consolidating conduit upstream end and the consolidating conduit downstream end toward the consolidating conduit downstream end. The air driven rotor assembly has a rotor assembly upstream end located downstream of the consolidating conduit downstream end. The air driven rotor assembly includes an air driven rotor.

In another aspect, a wind turbine system is disclosed. The wind turbine system includes a flow consolidating conduit and an air driven rotor assembly. The flow consolidating conduit is close sided and has a consolidating conduit length that extends from a consolidating conduit upstream end to a consolidating conduit downstream end. The flow consolidating conduit includes an airflow capture inlet at the consolidating conduit upstream end, and a plurality of flow partitions that subdivide a cross-sectional area of the flow consolidating conduit into three or more flow paths. Each flow partition and each flow path extend between the consolidating conduit upstream end and the consolidating conduit downstream end. Each flow partition has a partition downstream end located upstream of the consolidating conduit downstream end. At each partition downstream end, adjacent flow paths merge into a merged flow path. The three or more flow paths gradually merge into a single flow path at the consolidating conduit downstream end. Along the consolidating conduit length, the flow partitions gradually decrease in number towards the consolidating conduit downstream end. The cross-sectional area of the flow consolidating conduit decreases between the consolidating conduit upstream end and the consolidating conduit downstream end toward the consolidating conduit downstream end. The air driven rotor assembly has a rotor assembly upstream end located downstream of the consolidating conduit downstream end. The air driven rotor assembly includes an air driven rotor.

In another aspect, a method of generating energy in a wind turbine system is disclosed. The method includes capturing wind as airflow in an airflow capture inlet of the wind turbine system; and directing the airflow through a flow consolidating conduit of the wind turbine system. The flow consolidating conduit has a cross-sectional area that decreases towards a downstream end of the flow consolidating conduit. The method further includes partitioning the airflow using a plurality of flow partitions that subdivide the cross-sectional area of the flow consolidating conduit into three or more flow paths. The three or more flow paths gradually merge into a single flow path so that the airflow exits the flow consolidating conduit as consolidated airflow. The method further includes directing the consolidated airflow through an air driven rotor assembly driving an electric generator; and generating the energy at the electric generator.

In another aspect, a wind turbine system is disclosed. The wind turbine system includes a flow consolidating conduit and an air driven rotor assembly. The flow consolidating conduit extends from an airflow capture inlet to a consolidating conduit downstream end. The air driven rotor assembly has a rotor assembly upstream end located downstream of the consolidating conduit downstream end. The air driven rotor assembly includes a rotor housing, a rotor within the rotor housing, and an annular pre-rotor flow recirculation passage defined between the rotor housing and the rotor. The rotor has a plurality of air driven blades distributed around a rotor rotation axis. The rotor has a radially inward entry direction. The recirculation passage surrounds the rotor. The recirculation passage extends from a recirculation passage upstream end to a recirculation passage downstream end. The recirculation passage downstream end is open ended and provides fluid continuity from the recirculation passage downstream end to the recirculation passage upstream end. The recirculation passage has a passage cross-sectional area that decreases gradually from the recirculation passage upstream end to the recirculation passage downstream end.

In another aspect, a method of generating energy in a wind turbine system is disclosed. The method includes capturing wind as airflow in an airflow capture inlet of the wind turbine system; and directing the airflow through a flow consolidating conduit of the wind turbine system to provide a consolidated airflow to an air driven rotor of the wind turbine system. The method further includes directing the consolidated airflow through an open-ended and annular pre-rotor flow recirculation passage. The pre-rotor flow recirculation passage surrounds the rotor and directs airflow radially inward towards air driven blades of the rotor. The pre-rotor flow recirculation passage has a passage cross-sectional area that decreases gradually from a recirculation passage upstream end to a recirculation passage downstream end. The method further includes driving an electric generator using the air driven blades of the rotor; and generating the energy at the electric generator.

Other aspects and features of the teachings disclosed herein will become apparent to those ordinarily skilled in the art, upon review of the following description of the specific examples of the present disclosure.

DRAWINGS

The drawings included herewith are for illustrating various examples of apparatuses and methods of the present disclosure and are not intended to limit the scope of what is taught in any way. In the drawings.

Figure 1:
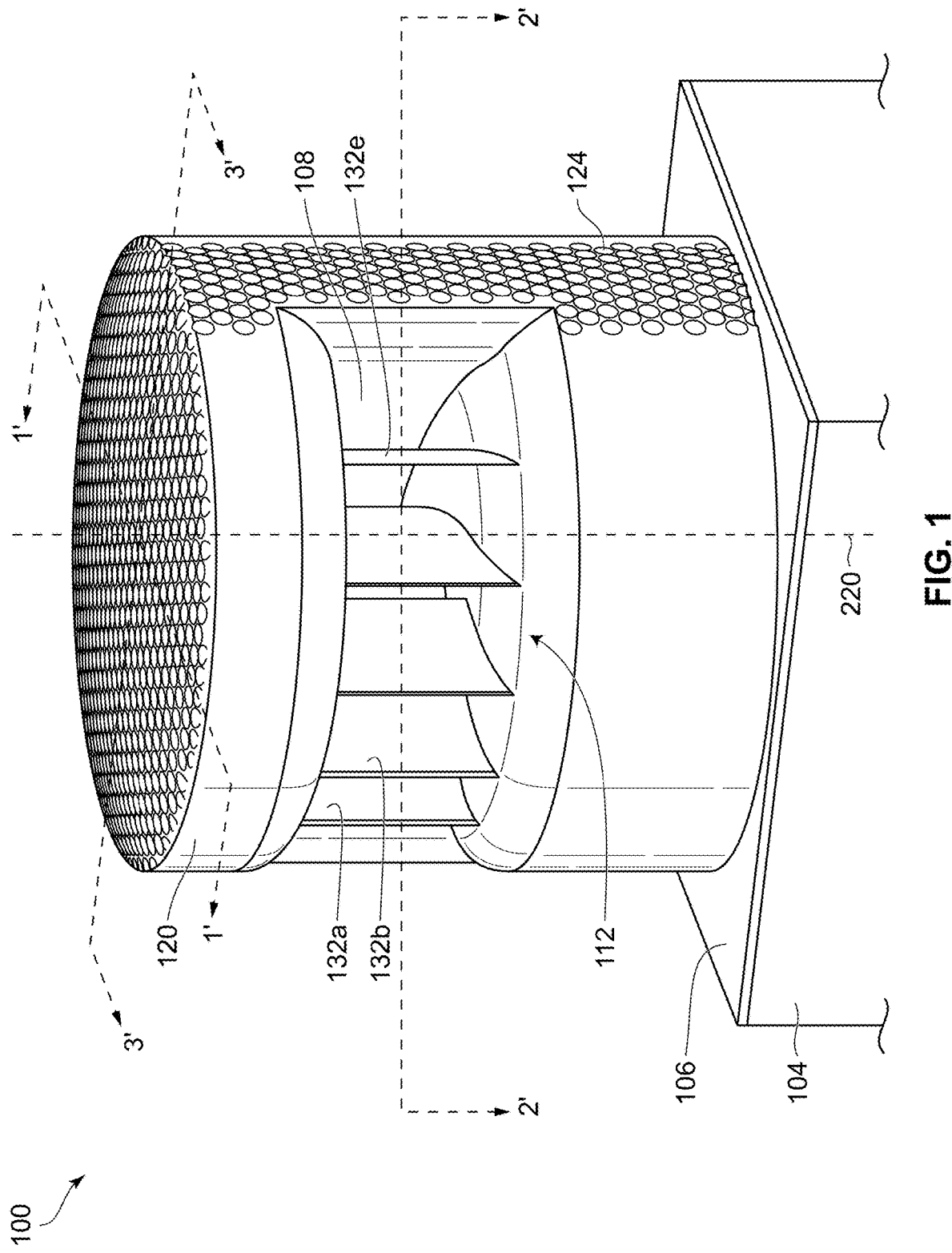
FIG. 1 is a front perspective view of a wind turbine system, in accordance with an example embodiment.

Further aspects and features of the example embodiments described herein will appear from the following description taken together with the accompanying drawings.

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a group of elements are said to 'collectively' perform an act where that act is performed by any one of the elements in the group, or performed cooperatively by two or more (or all) elements in the group.

Some elements herein may be identified by a part number, which is composed of a base number followed by an alphabetical or subscript-numerical suffix (e.g. 112$a$, or 112$_1$). Multiple elements herein may be identified by part numbers that share a base number in common and that differ by their suffixes (e.g. $112_1$, $112_2$, and $112_3$). All elements with a common base number may be referred to collectively or generically using the base number without a suffix (e.g. 112).

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

The incoming airflow of a wind turbine system can have substantial turbulence that can cause the wind turbine system to operate less efficiently than if the airflow had none/lower turbulence. In particular, if the airflow enters the rotor portion of a wind turbine system with high turbulence, the rotor portion will operate less efficiently (i.e., convert less of the wind energy to mechanical rotor rotation) than if the airflow entered with lower turbulence (i.e. higher flow coherence). Accordingly, at least some embodiments disclosed herein are configured to reduce the turbulence of the incoming airflow in a portion of the wind turbine system that is upstream of the rotor portion.

Embodiments of the wind turbine system described herein may implement one or more design aspects to reduce airflow turbulence (and increase flow coherence). For example, the disclosed wind turbine system may include a flow consolidating conduit having a cross-sectional area that decreases from an upstream end to a downstream end where the rotor assembly is located. As another example, the flow consolidating conduit may have flow partitions that subdivide the cross-sectional area of the flow consolidating conduit into multiple flow paths. The multiple flow paths may gradually merge into a single flow path at the downstream end of the flow consolidating conduit. As another example, the overall air flow path towards the entry into the rotor portion may have a gradually increasing curvature to prepare the flow to turn around the rotor while introducing little or no turbulence. The disclosed embodiments may use any one or suitable combination of the above-described design aspects to improve the wind turbine efficiency by reducing airflow turbulence.

Figure 2:
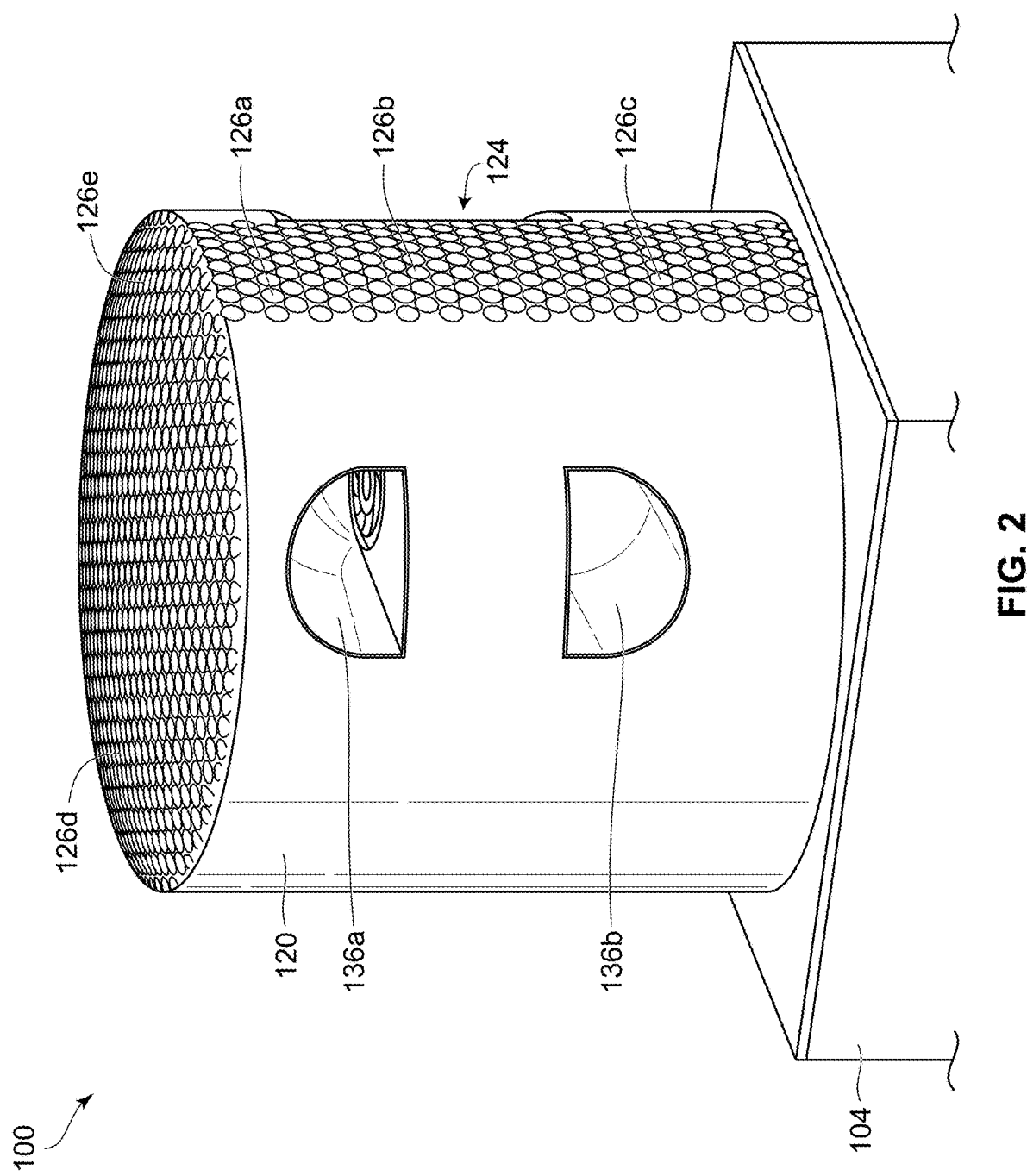
FIG. 2 is a rear perspective view of the wind turbine system of FIG. 1.
Figure 3:
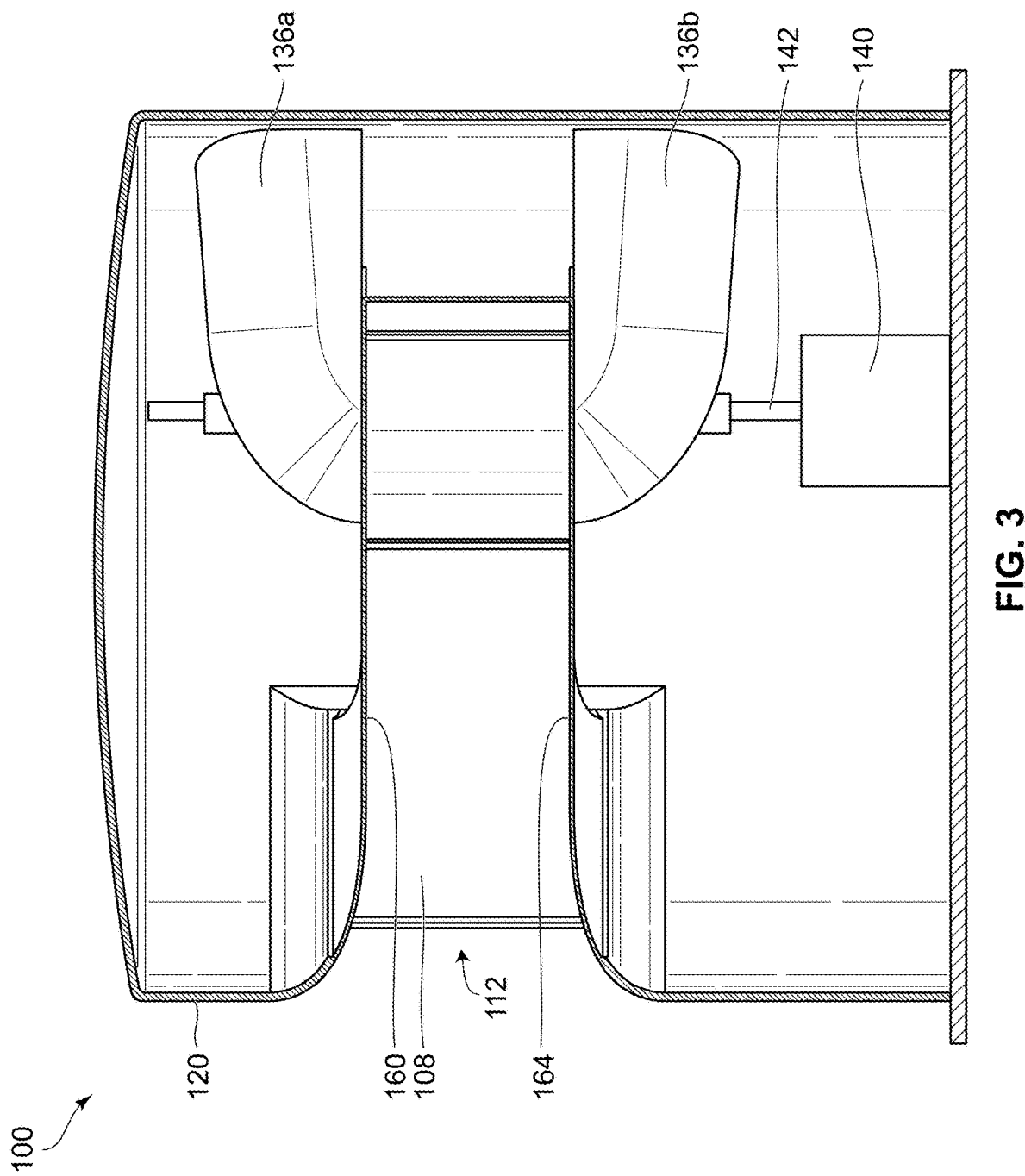
FIG. 3 is a cross-sectional view taken along line 1'-1' in FIG. 1.
Figure 4:
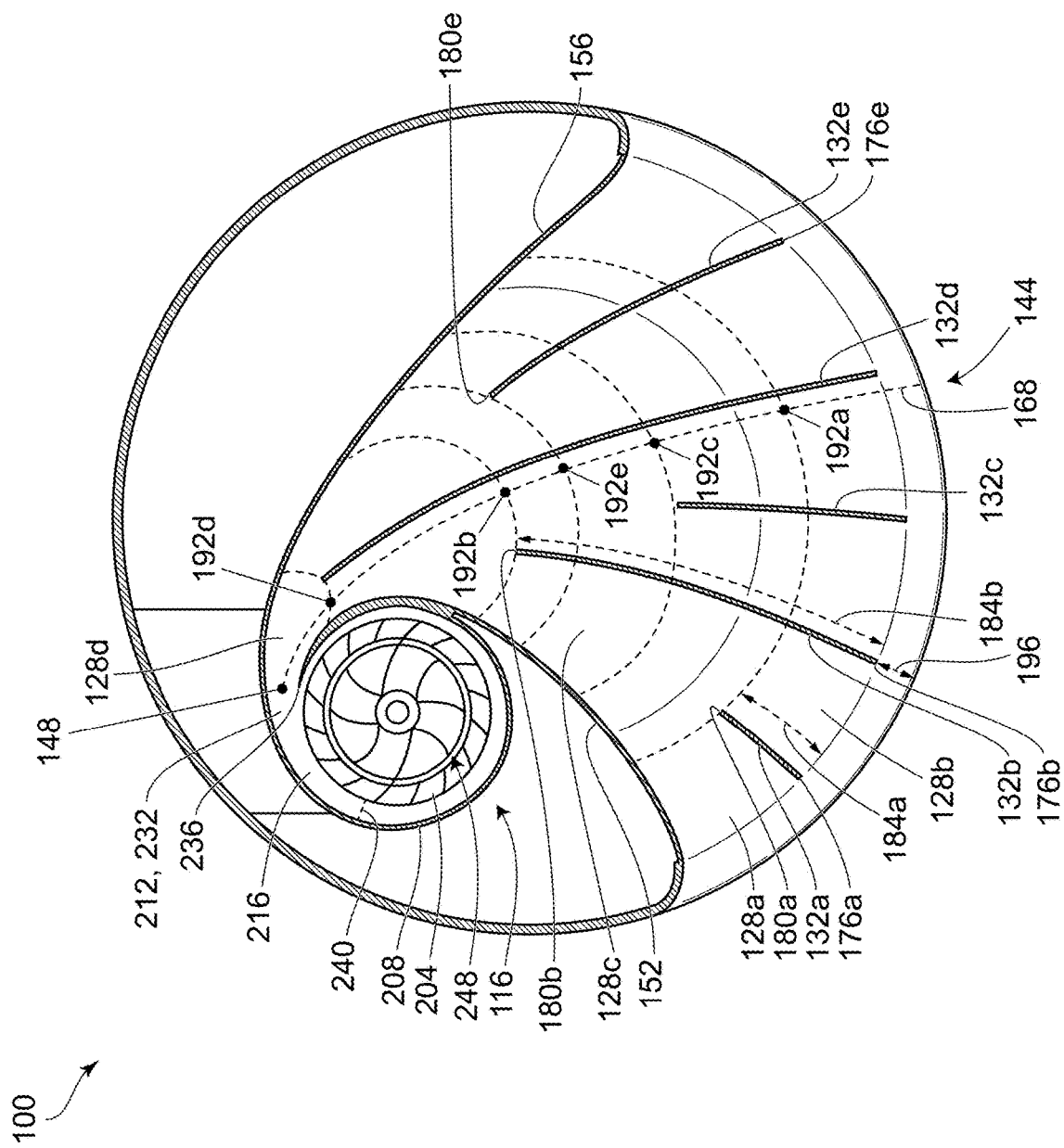
FIG. 4 is a cross-sectional view taken along line 2'-2' in FIG. 1.
Figure 5:
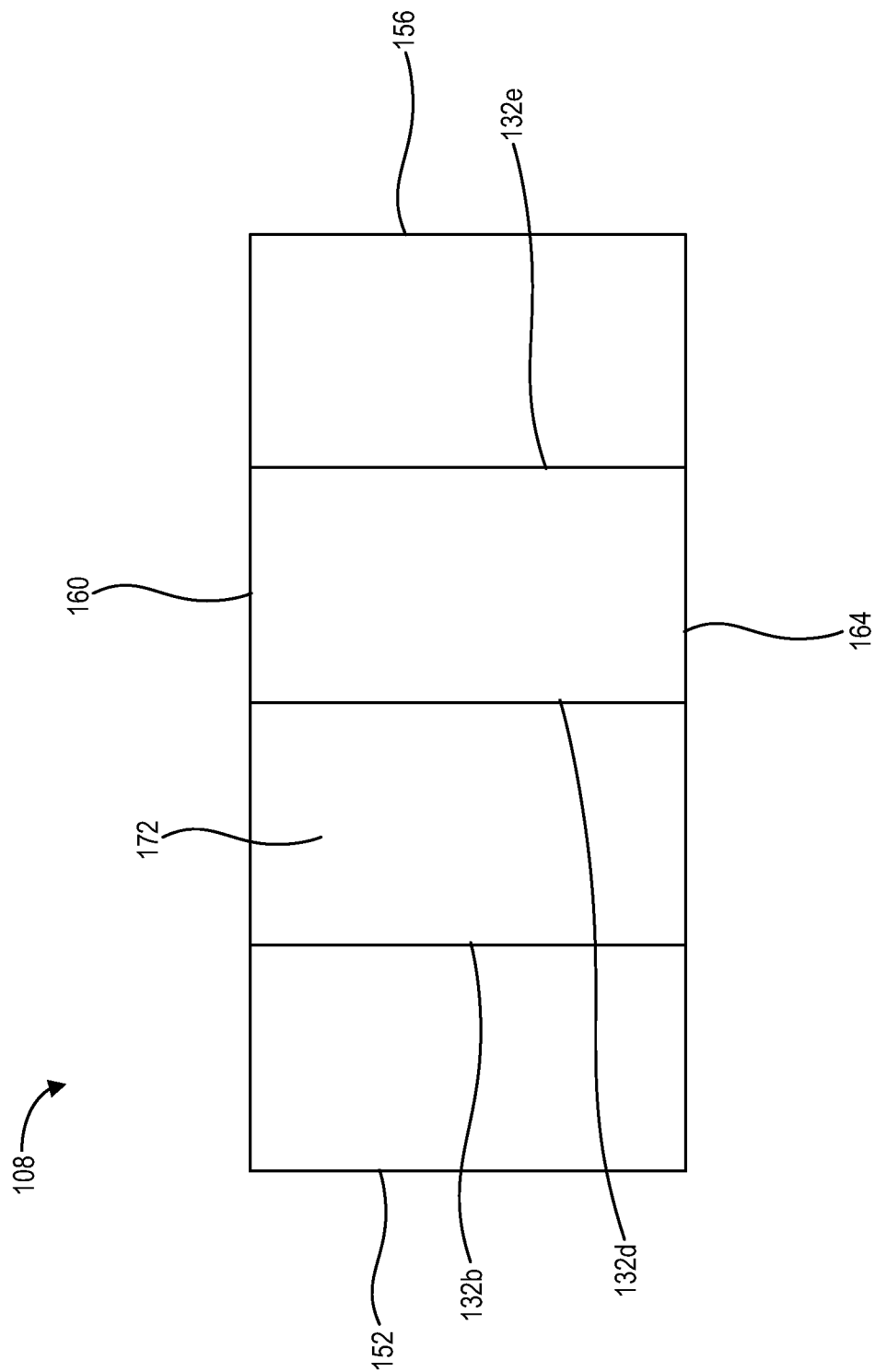
FIG. 5 is a cross-sectional view taken along line 3'-3' in FIG. 1.

Reference is now made to FIGS. 1 to 5. FIGS. 1 and 2 show a front perspective view and a rear perspective view respectively of a wind turbine system 100. FIGS. 3 and 4 show cross-sectional views of wind turbine system 100 taken along lines 1'-1' and 2'-2' respectively of FIG. 1. FIG. 5 shows a cross-sectional view of a flow consolidating conduit of wind turbine system 100 taken along line 3'-3' of FIG. 1.

Wind turbine system 100 may be installed at any suitable location where wind energy can be captured. In the illustrated example, wind turbine system 100 may be installed at a rooftop 106 of a building 104. Building 104 may be an industrial building (e.g. factory or warehouse), a commercial building (e.g. retail store or office building) or a residential building (e.g. apartment building, condominium building, house, or garage).

Wind turbine system 100 may include one or more (or all) of a flow consolidating conduit 108, an air driven rotor assembly 116, one or more outlet conduits 136, an electric generator 140, and a wind turbine housing 120. For example, in some embodiments, wind turbine system may include a flow consolidating conduit 108, an air driven rotor assembly 116, outlet conduits 136, and wind turbine housing 120, but may omit electric generator 140.

Flow consolidating conduit 108 may extend from a consolidating conduit upstream end 144 to a consolidating conduit downstream end 148. Flow consolidating conduit 108 may have a consolidating conduit length 168 that extends along the airflow direction from consolidating conduit upstream end 144 to consolidating conduit downstream end 148.

Flow consolidating conduit 108 may have any design suitable for efficiently capturing incident wind and forming the captured incident wind into a consolidated airflow directed towards air driven rotor assembly 116. For example, flow consolidating conduit 108 may be a close-sided conduit that is enclosed on an upper portion by a conduit ceiling 160, a lower portion by a conduit floor 164, and side portions by conduit sidewalls 152 and 156. The close sidedness of flow consolidating conduit 108 can enable the flow consolidating conduit to consolidate the airflow moving towards the rotor assembly, thereby providing a more laminar airflow (i.e., reduced turbulence and increased flow coherence).

Flow consolidating conduit 108 may have any cross-sectional area 172 suitable for supporting airflow from consolidating conduit upstream end 144 to consolidating conduit downstream end 148. Cross-sectional area 172 of flow consolidating conduit 108 is the area of flow consolidating conduit 108 along a cross-sectional plane that extends perpendicularly to the downstream flow direction. Cross-sectional area 172 may decrease between consolidating conduit upstream end 144 and consolidating conduit downstream end 148 towards consolidating conduit downstream end 148. For example, in the illustrated embodiment, a separation distance between conduit sidewalls 152 and 156 decreases between consolidating conduit upstream end 144 and consolidating conduit downstream end 148 toward consolidating conduit downstream end 148. In some example embodiments, cross-sectional area 172 decreases by at least 30%, such as 30% to 90%. Larger decreases in cross-sectional area 172, such as 70% to 90%, can result in higher airflow speeds at consolidating conduit downstream end 148. In alternative embodiments, cross-sectional area 172 decreases by less than 30% (e.g. 10% to 25%) or does not decrease.

Cross-sectional area 172 may decrease in any manner suitable to accelerate the flow exiting from consolidating conduit downstream end 148. For example, cross-sectional area 172 may decrease across the entirety of consolidating conduit length 168 or only a portion of consolidating conduit length 168, and may decrease continuously or in a stepwise manner. In the illustrated example, cross-sectional area 172 decreases across the entirety of consolidating conduit length 168 in a continuous manner. This may mitigate the introduction of additional turbulence to the airflow by allowing for a gradual decrease in cross-sectional area 172.

Flow consolidating conduit 108 may include an airflow capture inlet 112 and multiple flow partitions 132. Any suitably sized opening at consolidating conduit upstream end 144 may define airflow capture inlet 112. For example, airflow capture inlet 112 may be at least 100 cms wide (e.g., 100-300 cms wide) measured between consolidating conduit sidewalls 152 and 156. In some embodiments, airflow capture inlet 112 may be larger (e.g., 300 cms to 500 cms wide). A larger size of airflow capture inlet 112 may enable extraction of larger amounts of wind energy to provide higher power generation capacity. In some embodiments, airflow capture inlet 112 may be smaller (e.g., 20 cms to 100 cms wide). A smaller size of airflow capture inlet 112 may provide a more compact design and smaller footprint for wind turbine system 100. Airflow capture inlet 112 can capture incident wind and direct the captured wind into flow consolidating conduit 108.

Flow consolidating conduit 108 may include any number of flow partitions 132 suitable for efficiently reducing turbulence of the airflow (e.g., increasing flow coherence) before the airflow reaches air driven rotor assembly 116. For example, flow consolidating conduit 108 may have at least 1 flow partition such as 1-20 flow partitions 132, or at least 2 flow partitions, such as 2-20 flow partitions 132. In the illustrated example, flow consolidating conduit 108 is shown having five flow partitions 132a-132e. A higher number of flow partitions 132 (e.g. at least 10 flow partitions, such as 10-20 flow partitions) may allow flow consolidating conduit 108 to more greatly reduce turbulence (e.g. increase flow coherence) but also create more drag on the air flow due to the relatively higher combined surface area of the flow partitions. A lower number of flow partitions 132 (e.g. at least 2 flow partitions, such as 2-10 flow partitions) may result in somewhat lesser impact on turbulence reduction but also create less drag on the air flow due to the relatively lower combined surface area of the flow partitions.

Flow partitions 132 may partition the airflow captured at airflow capture inlet 112 into airflows having smaller cross-sectional areas. Flow partitions 132 may have any design suitable for efficiently partitioning airflow. For example, flow partitions 132 may extend between consolidating conduit upstream end 144 and consolidating conduit downstream end 148 and from conduit ceiling 160 to conduit floor 164, subdividing cross-sectional area 172 of flow consolidating conduit 108 into two or more flow paths 128. For example, FIG. 4 shows flow partition 132a partitioning incoming airflow into adjacent flow paths 128a and 128b. Each flow paths 128 may extend between consolidating conduit upstream end 144 and consolidating conduit downstream end 148 and the extent of each flow path 128 is based upon the flow partition(s) 132 that define the flow path 128.

Each flow partition 132 may have a curved partition length 184 extending along the airflow direction between a partition upstream end 176 and a partition downstream end 180. Partition downstream end 180 of each flow partition 132 may be located downstream of consolidating conduit upstream end 144 and upstream of consolidating conduit downstream end 148.

At each partition downstream end 180, adjacent flow paths 128 partitioned by that partition downstream end 180 end and may merge into a merged flow path 132. For example, adjacent flow paths 128a and 128b shown in FIG. 4 merge into a merged flow path 128c at partition downstream end 180a.

Flow partitions 132 may or may not all have the same partition length 184. In some embodiments, partition length 184 of each flow partition 132 may be different from partition length 184 of at least one other flow partition. In some embodiments, every flow partition 132 has a different partition length 184 from every other flow partition 132. In the illustrated example, partition length 184a of flow partition 132a is different from partition lengths 184 of each of the other flow partitions 132b-132e. In some embodiments, partition length 184 of a flow partition 132 may be less than 90% or greater than 110% of partition length 184 of at least one other flow partition 132, for example, 50% to 90% or 110% to 150% of partition length 184 of at least one other flow partition 132.

Flow partitions 132 may or may not be differently positioned along conduit length 168. In some embodiments, partition downstream end 180 of each flow partition 132 may have a conduit-length position 192 that is different from partition downstream end 180 of at least one other flow partition 132. The conduit-length position 192 may be defined as the position along the consolidated conduit length 168 in the direction of airflow. In the illustrated example embodiment, as shown in FIG. 4, partition downstream end 180a of flow partition 132a has a conduit-length position 192a that is different from conduit-length position 192b of partition downstream end 180b of flow partition 132b. In the illustrated example, partition downstream end 180a of flow partition 132a has a conduit-length position 192a that is different from the conduit-length position of partition downstream ends of all the other flow partitions 132.

In some embodiments, partition upstream end 176 of each flow partition 132 may be recessed from airflow capture inlet 112. In the illustrated example, partition upstream end 176b of flow partition 132b is recessed from airflow capture inlet 112 by recess length 196. One or more of conduit ceiling 160, conduit floor 164, and/or conduit side walls 152 and 156 may have a curved surface portion corresponding to recess length 196 to reduce turbulence of airflow entering at airflow capture inlet 112. In alternative embodiments, partition upstream end 176 of each flow partition 132 may be positioned at airflow capture inlet 112 without any recess length.

An abrupt decrease in the number of flow partitions 132 along consolidating conduit length 168 may cause turbulence as airflow from multiple flow paths merge together at the same location. In some embodiments, flow partitions 132 may gradually decrease in number, along consolidating conduit length 168, towards consolidating conduit downstream end 148. This may enable the multiple flow paths to gradually merge into a single flow path 128d at consolidating conduit downstream end 148 thereby reducing turbulence. In the illustrated example embodiment, the number of flow partitions 132 gradually decreases in number from 5 at consolidating conduit upstream end 144, to 4 at conduit-length position 192a, to 3 at conduit-length position 192c, to 2 at conduit-length position 192b, to 1 at conduit-length position 192e, and to 0 at conduit-length position 192d. The corresponding number of flow paths at any position is one more than the number of flow partitions 132 at that position. In the illustrated example, the number of flow paths 128 gradually decreases from 6 at consolidating conduit upstream end 144 to a single flow path 128d at consolidating conduit downstream end 148.

Air driven rotor assembly 116 can have any design suitable for driving a rotor with airflow received from flow consolidating conduit 108. Air driven rotor assembly 116 may have a rotor assembly upstream end 212 that is in fluid communication with flow consolidating conduit 108 and is located downstream of consolidating conduit downstream end 148. This can enable the consolidated airflow from flow consolidating conduit 108 to flow into air driven rotor assembly 116 at rotor assembly upstream end 248.

Figure 6:
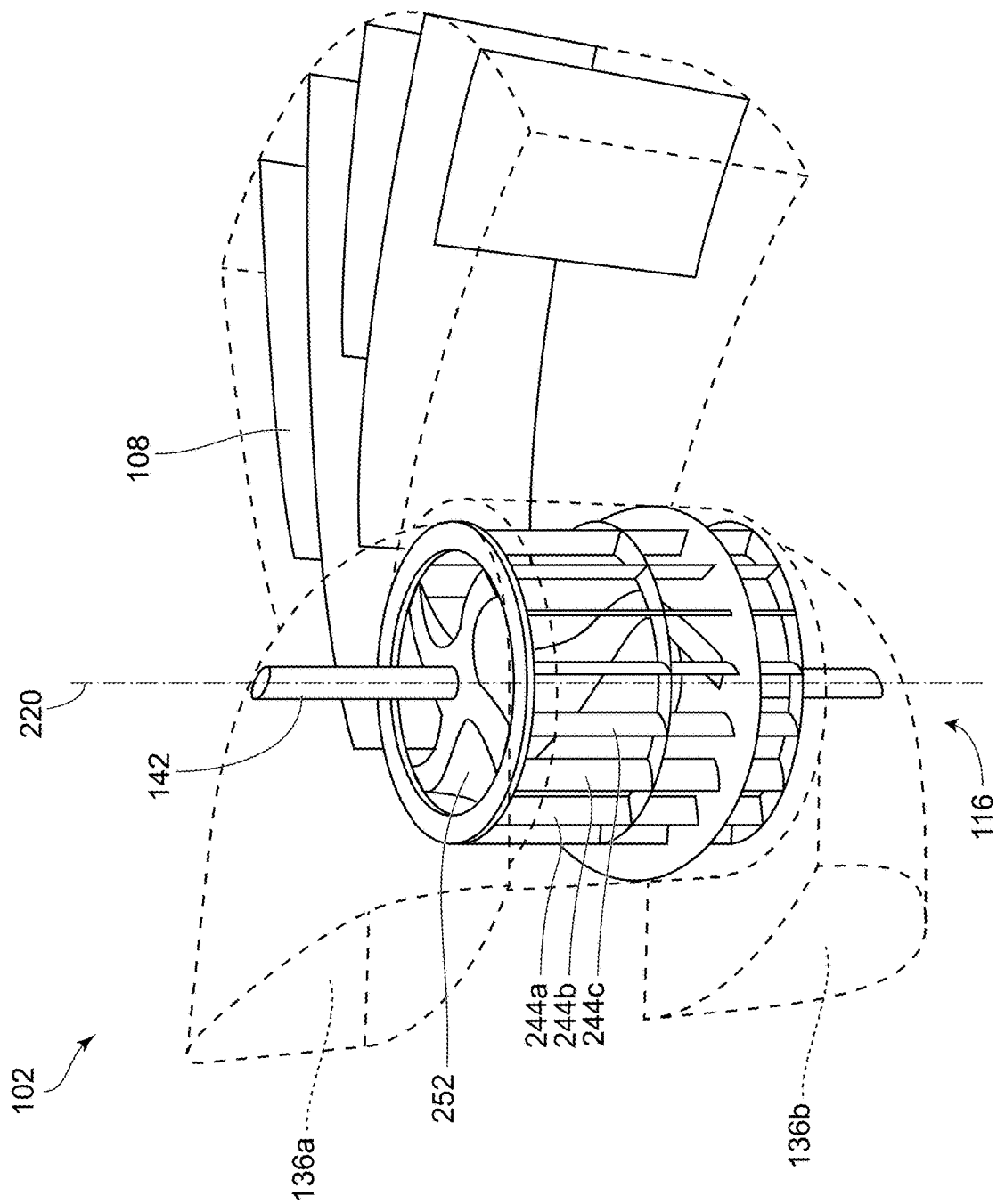
FIG. 6 is a perspective view of an air handling subassembly of the wind turbine system of FIG. 1.
Figure 7B:
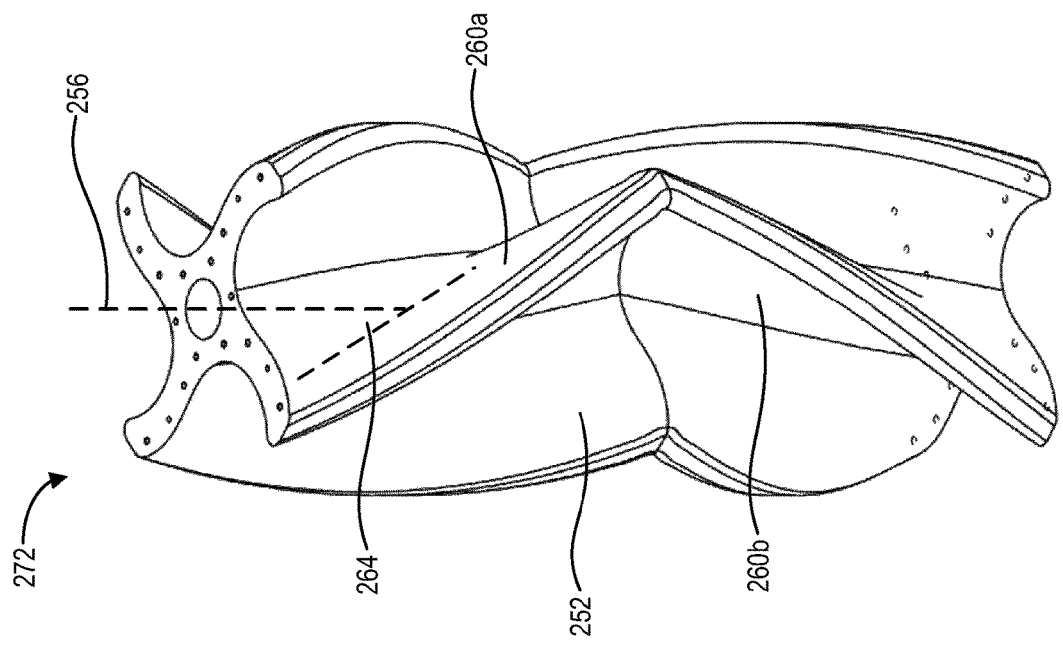
FIG. 7B is a perspective view of an air redirecting portion of the rotor of the wind turbine system of FIG. 1.
Figure 7A:
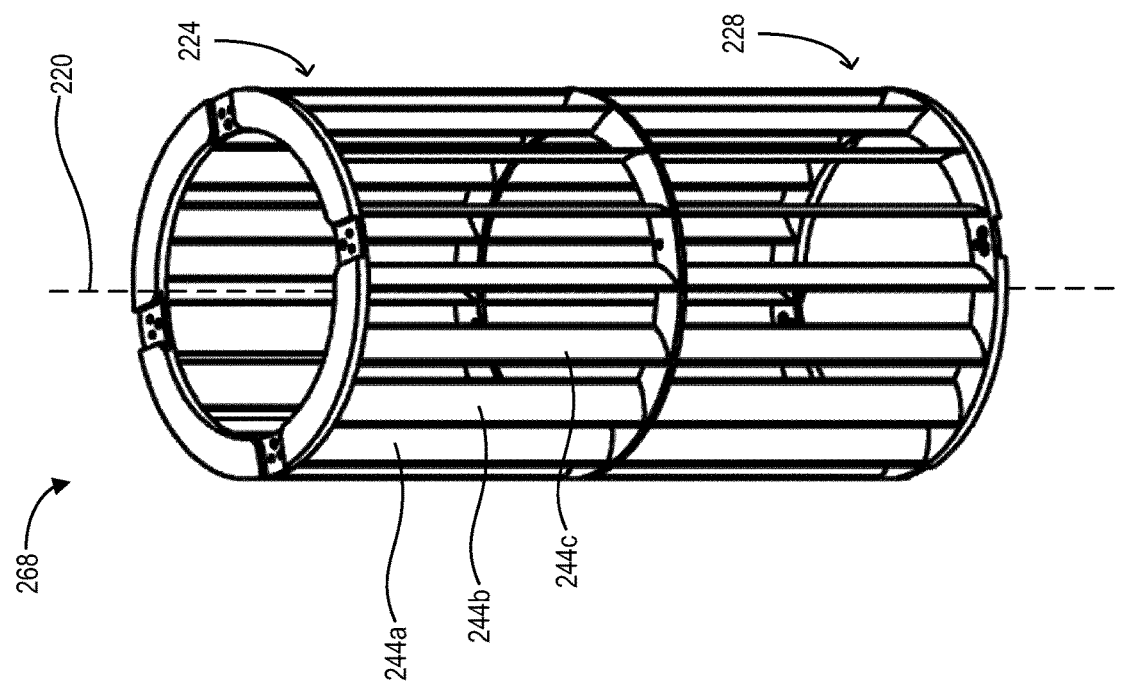
FIG. 7A is a perspective view of an air driven blades portion of a rotor of the wind turbine system of FIG. 1.

Air driven rotor assembly 116 may include a rotor housing 208, an annular pre-rotor flow recirculation passage 216 and a rotor 204. In addition to FIGS. 1 to 5, concurrent reference is now made to FIGS. 6, 7A and 7B. FIG. 6 is a perspective view of an air handling subassembly 102 of wind turbine system 100. Air handling subassembly 102 may include flow consolidating conduit 108, air driven rotor assembly 116 and outlet conduits 136. FIG. 7A is a perspective view of an air driven blades portion 268 of rotor 204. FIG. 7B is a perspective view of an air redirecting portion 272 of rotor 204.

Rotor housing 208 may have any design suitable for enclosing rotor 204 and defining pre-rotor flow recirculation passage 216. As shown, rotor 204 has a rotation axis 220. Rotor 204 may extend parallel to rotation axis 220 from a first rotor end 224 to a second rotor end 228. In some examples, rotor housing 208 may define annular pre-rotor flow recirculation passage 216 where annular pre-rotor recirculation passage 216 is bounded between rotor housing 208 and rotor 204. As illustrated in FIG. 4, annular pre-rotor flow recirculation passage 216 may surround rotor 204. For example, rotor housing 208 may extend substantially parallel to rotation axis 220 as shown.

Pre-rotor flow recirculation passage 216 may extend from a recirculation passage upstream end 232 to a recirculation passage downstream end 236. Recirculation passage upstream end 232 may be positioned at rotor assembly upstream end 248 to receive the consolidated airflow from flow consolidating conduit 108.

Pre-rotor flow recirculation passage 216 may have a passage cross-sectional area that decreases gradually from recirculation passage upstream end 232 to recirculation passage downstream end 236. The cross-sectional area may be defined as the area of the pre-rotor flow recirculation passage 216 that extends along a cross-sectional plane 240 extending perpendicular to the airflow through pre-rotor flow recirculation passage 216. The cross-sectional area may decrease gradually as the width of pre-rotor flow recirculation passage 216 decreases gradually from recirculation passage upstream end 232 to recirculation passage downstream end 236. The cross-sectional area may decrease along the entire length of pre-rotor flow recirculation passage 216 or only a portion, and may decrease continuously or in a stepwise manner. In the illustrated example, the cross-sectional area decreases in a continuous manner from recirculation passage upstream end 232 to recirculation passage downstream end 236. This may gradually force airflow from pre-rotor flow recirculation passage 216 to enter rotor 204 in a radially inward direction, while mitigating the addition of flow turbulence.

In some embodiments, pre-rotor flow recirculation passage 216 may be open-ended and provide fluid continuity from recirculation passage downstream end 236 to recirculation passage upstream end 232. This can enable any remaining airflow within pre-rotor flow recirculation passage 216 (that did not enter rotor 204) to flow from recirculation passage upstream end 232 to recirculation passage downstream end 236 and reenter pre-rotor flow recirculation passage 216 at the juncture of recirculation passage downstream and upstream ends 236, 232. This may improve the efficiency of wind turbine system 100 by utilizing the remaining airflow within pre-rotor flow recirculation passage 216 to drive rotor 204 instead of being exhausted or suddenly forced into rotor 204 at recirculation passage downstream end 236 (which may create backpressure and turbulence).

Rotor 204 may have any design suitable for being driven by airflow entering from pre-rotor flow recirculation passage 216. For example, air driven blades portion 268 of rotor 204 may include a plurality of air driven blades 244. In the illustrated example embodiment, each air driven blade 244 extends in a direction parallel to rotation axis 220 and is positioned around the periphery of rotor 204. Air driven blades 244 may be shaped to interact with the entering airflow to drive rotor 204 to rotate about rotation axis 220. Each air driven blade 244 may have a curvature that provides a radially inward discharge direction 248. That is, airflow that interacts with each air driven blade 244 may be discharged radially inwardly (i.e. generally towards rotation axis 220). In alternative embodiments, air driven blades 244 are not positioned around the periphery of rotor 204.

In some embodiments, rotor 204 may include air redirecting portion 272 (FIG. 7B) that is suitable for redirecting airflow. For example, air redirecting portion 272 of rotor 204 may include one or more air redirecting blades 252. In the illustrated example embodiment, air redirecting blades 252 are located radially inward of air driven blades 244. That is, as shown, air redirecting blades 252 are located closer to rotation axis 220 than air driven blades 244. Air redirecting blades 252 may have an axial discharge direction 256. In the illustrated example, axial discharge direction 256 is substantially parallel to rotation axis 220. The term "substantially parallel" as used herein can mean, for example, within 30 degrees of parallel. Accordingly, air redirecting blades 252 may redirect airflow to be discharged from rotor 204 through flow discharge windows at rotor ends 224 and 228. The flow discharge windows may be fluidly connected to one or more outlet conduits to enable the airflow to be discharged from wind turbine system 100.

Air redirecting blades 252 can have any design suitable for redirecting airflow axially. For example, air redirecting blades 252 can have a herringbone shape as shown. In the illustrated example, air redirecting blades 252 may include a first portion 260a and a second portion 260b forming the herringbone shape. As shown, first portions 260a may be at an angle 264 relative to second portion 260b. In some embodiments, angle 264 can be at least 25 degrees, such as 25 degrees to 30 degrees, from axial discharge direction 256. In alternative embodiments, air redirecting blades 252 do not have a herringbone shape. Alternative embodiments may have no air redirecting blades 252.

Wind turbine system 100 may have any structure suitable for discharging airflow downstream of air driven rotor assembly 116. In the illustrated embodiment, wind turbine system 100 includes two outlet conduits 136a and 136b (FIGS. 2 and 3) through which airflow can be discharged from wind turbine system 100.

Wind turbine system 100 may have any components suitable for generating electricity from the air driven activation of rotor 204. In the illustrated example embodiment, wind turbine system 100 may include electric generator 140 mechanically connected by an axle 142 to rotor 204. Electric generator 140 can generate electrical energy from the rotary force (torque) of rotor 204. Any suitable electric generator may be used. In some embodiments, electric generator 140 may include an axial flux generator. In alternative embodiments, other electric generator designs may be used. In some embodiments, electric generator 140 may have at least a 10 kW power generation capacity. For example, electric generator 140 may have a 10 kW-1,000 kW power generation capacity. In some embodiments, wind turbine system 100 may be designed for smaller footprints and electric generator 140 may have a smaller power generation capacity (e.g., 1-10 kW).

In some embodiments, wind turbine system 100 may include any suitable energy storage member (e.g., one or more batteries) for storing energy generated by electric generator 140. In other embodiments, wind turbine system 100 may not include any energy storage member. For example, output of electric generator 140 may be connected to an electric grid for distributing the energy generated by electric generator 140.

Wind turbine housing 120 may have any design suitable to house the other components of wind turbine system 100 (e.g., flow consolidating conduit, air driven rotor assembly 116, outlet conduits 136 and electric generator 140). Wind turbine housing 120 can be made of any rigid material providing sufficient structural strength and integrity to support the other components of wind turbine system 100. Wind turbine system 100 may be installed in an outdoor environment. The material used to make wind turbine housing 120 can be weather-resistant and capable of withstanding the outdoor environment. In some embodiments, wind turbine housing 120 may be made using metallic materials like steel, aluminum, or sheet metal, which may be bare, galvanized, coated, and/or painted. In other embodiments wind turbine housing 120 may be made using non-metallic materials such as plastic (e.g. resin).

In some embodiments, a portion 124 of an outer surface of wind turbine housing 120 may be a dimpled surface. The dimpled surface can enable reduction in drag between the incident wind and wind turbine housing 120. Drag reduction can enable improvement in efficiency of wind turbine system 100. As shown in FIG. 1, portion 124 may include a plurality of dimples 126 (e.g. at least 100 dimples, such as 100 to 1,000,000 dimples), which may be randomly positioned or arranged in a geometric pattern as shown. A sampling of dimples 126 have been labelled 126a-126e in FIG. 2.

Figure 8:
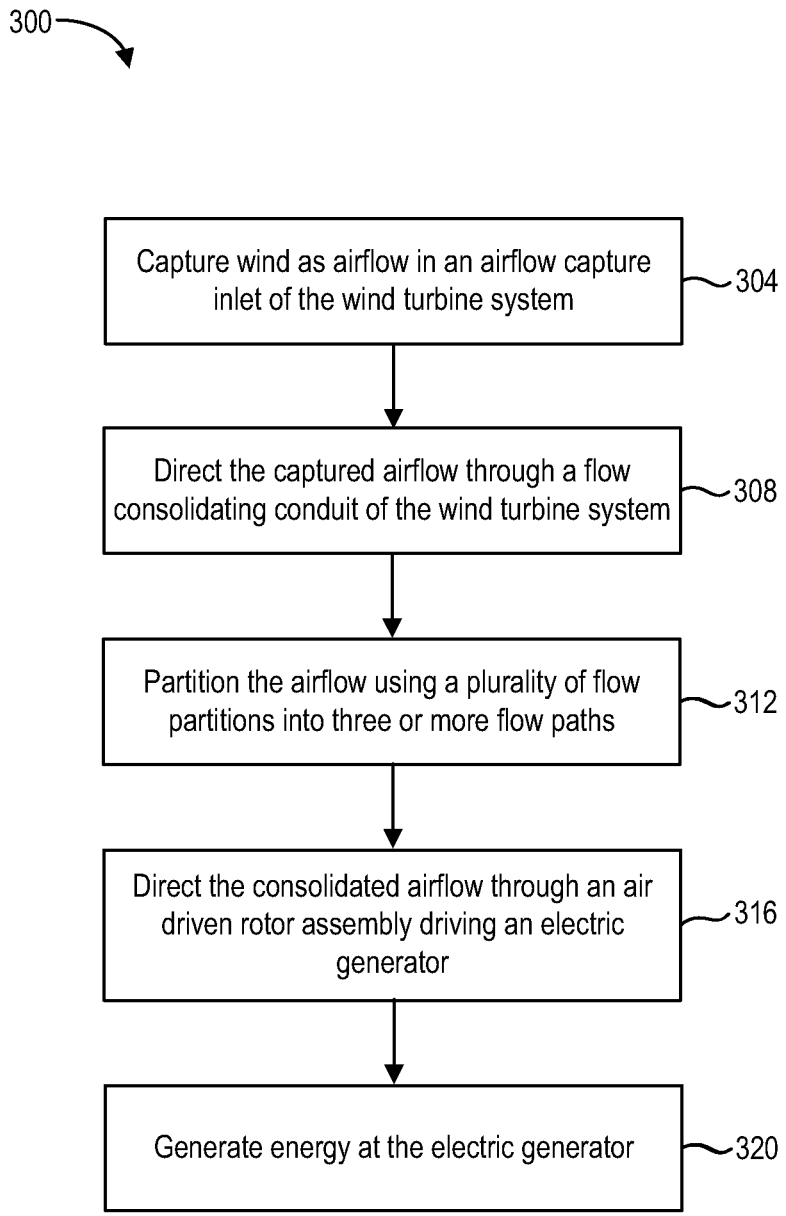
FIG. 8 is a flowchart of an example method of generating energy in the wind turbine system of FIG. 1.

Referring now to FIG. 8, shown therein is a flowchart of an example method 300 of generating energy in a wind turbine system. The wind turbine system may be, for example, wind turbine system 100 and concurrent reference is made to FIGS. 1 to 7.

At act 304, method 300 may include capturing wind as airflow in an airflow capture inlet of the wind turbine system. For example, incident wind may be captured in airflow capture inlet 112 of wind turbine system 100 in any manner suitable for directing the captured airflow downstream.

At act 308, method 300 may include directing the captured airflow through a flow consolidating conduit of the wind turbine system. For example, the captured airflow may be directed through flow consolidating conduit 108. As described herein, flow consolidating conduit 108 may have a cross-sectional area 172 that decreases towards a downstream end of flow consolidating conduit 108.

At act 312, method 300 may include partitioning the airflow using a plurality of flow partitions that subdivide the cross-sectional area of the flow consolidating conduit into three or more flow paths. For example, flow consolidating conduit 108 may have multiple flow partitions 132a-132n that subdivide cross-sectional area 172 of flow consolidating conduit 108 into three or more flow paths 128. The flow paths 128 may gradually merge into a single flow path so that the airflow exits flow consolidating conduit 108 as consolidated airflow.

At act 316, method 300 may include directing the consolidated airflow through an air driven rotor assembly driving an electric generator. For example, the consolidated airflow may be directed through air driven rotor assembly 116. Air driven rotor assembly 116 may include multiple air driven blades that drive electric generator 140.

At act 320, method 300 may include generating the energy at the electric generator. The generated energy may be stored and/or supplied to a grid.

Figure 9:
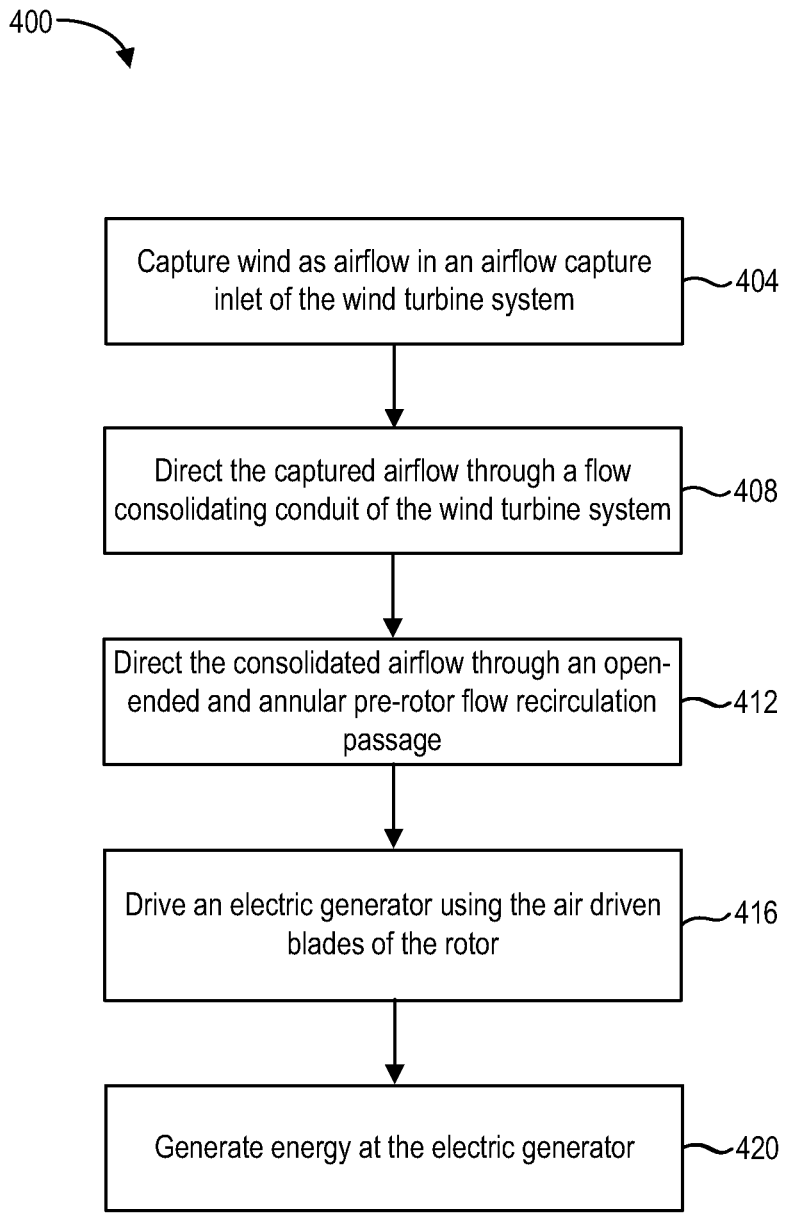
FIG. 9 is a flowchart of another example method of generating energy in the wind turbine system of FIG. 1.

Referring now to FIG. 9, shown therein is a flowchart of an example method 400 of generating energy in a wind turbine system. The wind turbine system may be, for example, wind turbine system 100 and concurrent reference is made to FIGS. 1 to 7.

At act 404, method 400 may include capturing wind as airflow in an airflow capture inlet of the wind turbine system. For example, incident wind may be captured in airflow capture inlet 112 of wind turbine system 100 in any manner suitable for directing the captured airflow downstream.

At act 408, method 400 may include directing the captured airflow through a flow consolidating conduit of the wind turbine system. For example, the captured airflow may be directed through flow consolidating conduit 108. Flow consolidating conduit 108 may provide a consolidated airflow to air driven rotor 204 of wind turbine system 100.

At act 412, method 400 may include directing the consolidated airflow through an open-ended and annular pre-rotor flow recirculation passage. For example, the consolidated airflow may be directed through pre-rotor flow recirculation passage 216. As described herein, pre-rotor flow recirculation passage 216 may surround rotor 204 and direct airflow radially inward towards air driven blades 244 of rotor 204. Pre-rotor flow recirculation passage 216 may have a passage cross-sectional area that decreases gradually from recirculation passage upstream end 232 to recirculation passage downstream end 236.

At act 416, method 400 may include driving an electric generator using the air driven blades of the rotor. For example, air driven blades 244 of rotor 204 may drive electric generator 140.

At act 420, method 400 may include generating the energy at the electric generator. The generated energy may be stored and/or supplied to a grid.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Items

Item 1: A wind turbine system comprising: a flow consolidating conduit that is close sided and extends from a consolidating conduit upstream end to a consolidating conduit downstream end, the flow consolidating conduit comprising: an airflow capture inlet at the consolidating conduit upstream end; and a plurality of flow partitions that subdivide a cross-sectional area of the flow consolidating conduit into three or more flow paths, each flow partition and each flow path extending between the consolidating conduit upstream end and the consolidating conduit downstream end, each flow partition having a partition downstream end located upstream of the consolidating conduit downstream end, at each partition downstream end, adjacent flow paths merging into a merged flow path, the three or more flow paths gradually merging into a single flow path at the consolidating conduit downstream end, each flow partition having a partition length, the partition length of each flow partition being different from the partition length of at least one other flow partition; the cross-sectional area of the flow consolidating conduit decreasing between the consolidating conduit upstream end and the consolidating conduit downstream end toward the consolidating conduit downstream end; and an air driven rotor assembly having a rotor assembly upstream end located downstream of the consolidating conduit downstream end, the air driven rotor assembly comprising an air driven rotor.

Item 2: The wind turbine system of any preceding item, wherein each flow partition further comprises a partition upstream end, the partition upstream end located downstream of the airflow capture inlet.

Item 3: The wind turbine system of any preceding item, further comprising an electric generator, the electric generator being drivingly connected to the air driven rotor.

Item 4: The wind turbine system of any preceding item, further comprising a wind turbine housing that encloses the flow consolidating conduit and the air driven rotor assembly.

Item 5: The wind turbine system of any preceding item, wherein at least a portion of an outer surface of the wind turbine housing is a dimpled surface.

Item 6: A building comprising the wind turbine system of any preceding item.

Item 7: A wind turbine system comprising: a flow consolidating conduit that is close sided and extends from a consolidating conduit upstream end to a consolidating conduit downstream end, the flow consolidating conduit having a conduit length, and the flow consolidating conduit comprising: an airflow capture inlet at the consolidating conduit upstream end; and a plurality of flow partitions that subdivide a cross-sectional area of the flow consolidating conduit into three or more flow paths, each flow partition and each flow path extending between the consolidating conduit upstream end and the consolidating conduit downstream end, each flow partition having a partition downstream end located upstream of the consolidating conduit downstream end, at each partition downstream end, adjacent flow paths merging into a merged flow path, the three or more flow paths gradually merging into a single flow path at the consolidating conduit downstream end, each partition downstream end having a conduit-length position that is different from at least one other partition downstream end; the cross-sectional area of the flow consolidating conduit decreasing between the consolidating conduit upstream end and the consolidating conduit downstream end toward the consolidating conduit downstream end; and an air driven rotor assembly having a rotor assembly upstream end located downstream of the consolidating conduit downstream end, the air driven rotor assembly comprising an air driven rotor.

Item 8: The wind turbine system of any preceding item, wherein each flow partition further comprises a partition upstream end, the partition upstream end located downstream of the airflow capture inlet.

Item 9: The wind turbine system of any preceding item, further comprising an electric generator, the electric generator being drivingly connected to the air driven rotor.

Item 10: The wind turbine system of any preceding item, further comprising a wind turbine housing that encloses the flow consolidating conduit and the air driven rotor assembly.

Item 11: The wind turbine system of any preceding item, wherein at least a portion of an outer surface of the wind turbine housing is a dimpled surface.

Item 12: A building comprising the wind turbine system of any preceding item.

Item 13: A wind turbine system comprising: a flow consolidating conduit that is close sided and has a consolidating conduit length that extends from a consolidating conduit upstream end to a consolidating conduit downstream end, the flow consolidating conduit comprising: an airflow capture inlet at the consolidating conduit upstream end; and a plurality of flow partitions that subdivide a cross-sectional area of the flow consolidating conduit into three or more flow paths, each flow partition and each flow path extending between the consolidating conduit upstream end and the consolidating conduit downstream end, each flow partition having a partition downstream end located upstream of the consolidating conduit downstream end, at each partition downstream end, adjacent flow paths merging into a merged flow path, the three or more flow paths gradually merging into a single flow path at the consolidating conduit downstream end, along the consolidating conduit length, the flow partitions gradually decrease in number towards the consolidating conduit downstream end; the cross-sectional area of the flow consolidating conduit decreasing between the consolidating conduit upstream end and the consolidating conduit downstream end toward the consolidating conduit downstream end; and an air driven rotor assembly having a rotor assembly upstream end located downstream of the consolidating conduit downstream end, the air driven rotor assembly comprising an air driven rotor.

Item 14: The wind turbine system of any preceding item, wherein each flow partition further comprising a partition upstream end, the partition upstream end located downstream of the airflow capture inlet.

Item 15: The wind turbine system of any preceding item, further comprising an electric generator, the electric generator being drivingly connected to the air driven rotor.

Item 16: The wind turbine system of any preceding item, further comprising a wind turbine housing that encloses the flow consolidating conduit and the air driven rotor assembly.

Item 17: The wind turbine system of any preceding item, wherein at least a portion of an outer surface of the wind turbine housing is a dimpled surface.

Item 18: A building comprising the wind turbine system of any preceding item.

Item 19: A method of generating energy in a wind turbine system, the method comprising: capturing wind as airflow in an airflow capture inlet of the wind turbine system; directing the airflow through a flow consolidating conduit of the wind turbine system, the flow consolidating conduit having a cross-sectional area that decreases towards a downstream end of the flow consolidating conduit; partitioning the airflow using a plurality of flow partitions that subdivide the cross-sectional area of the flow consolidating conduit into three or more flow paths, the three or more flow paths gradually merging into a single flow path so that the airflow exits the flow consolidating conduit as consolidated airflow; directing the consolidated airflow through an air driven rotor assembly driving an electric generator; and generating the energy at the electric generator.

Item 20: The method of any preceding item, wherein along a length of the consolidating conduit, the flow partitions gradually decrease in number towards the consolidating conduit downstream end.

Item 21: A wind turbine system comprising: a flow consolidating conduit that extends from an airflow capture inlet to a consolidating conduit downstream end; and an air driven rotor assembly having a rotor assembly upstream end located downstream of the consolidating conduit downstream end, the air driven rotor assembly comprising: a rotor housing; a rotor within the rotor housing, the rotor having a plurality of air driven blades distributed around a rotor rotation axis, the rotor having a radially inward entry direction, an annular pre-rotor flow recirculation passage defined between the rotor housing and the rotor, the recirculation passage surrounding the rotor, the recirculation passage extending from a recirculation passage upstream end to a recirculation passage downstream end, the recirculation passage downstream end being open ended and providing fluid continuity from the recirculation passage downstream end to the recirculation passage upstream end, the recirculation passage having a passage cross-sectional area that decreases gradually from the recirculation passage upstream end to the recirculation passage downstream end.

Item 22: The wind turbine system of any preceding item, wherein the plurality of air driven blades have a radially inward discharge direction.

Item 23: The wind turbine system of any preceding item, wherein the rotor further having multiple air redirecting blades located radially inward of the air driven blades.

Item 24: The wind turbine system of any preceding item, wherein the air redirecting blades have an axial discharge direction that is substantially parallel to the rotation axis.

Item 25: The wind turbine system of any preceding item, wherein the air redirecting blades have a herringbone shape.

Item 26: The wind turbine system of any preceding item, wherein the passage cross-sectional area decreases continually from the recirculation passage upstream end to the recirculation passage downstream end.

Item 27: The wind turbine system of any preceding item, wherein a plurality of flow partitions subdivide a cross-sectional area of the flow consolidating conduit into three or more flow paths, the three or more flow paths gradually merging into a single flow path at the consolidating conduit downstream end.

Item 28: The wind turbine system of any preceding item, further comprising an electric generator, the electric generator being connected to the air driven rotor.

Item 29: The wind turbine system of any preceding item, further comprising a wind turbine housing that encloses the flow consolidating conduit and the air driven rotor assembly.

Item 30: The wind turbine system of any preceding item, wherein at least a portion of an outer surface of the wind turbine housing is a dimpled surface.

Item 31: The wind turbine system of any preceding item, further comprising an outlet conduit in fluid connection with the rotor to discharge airflow from the rotor out of the wind turbine system.

Item 32: A building comprising the wind turbine system of any preceding item.

Item 33: A method of generating energy in a wind turbine system, the method comprising: capturing wind as airflow in an airflow capture inlet of the wind turbine system; directing the airflow through a flow consolidating conduit of the wind turbine system to provide a consolidated airflow to an air driven rotor of the wind turbine system; directing the consolidated airflow through an open-ended and annular pre-rotor flow recirculation passage that surrounds the rotor and directs airflow radially inward towards air driven blades of the rotor, the pre-rotor flow recirculation passage having a passage cross-sectional area that decreases gradually from a recirculation passage upstream end to a recirculation passage downstream end; driving an electric generator using the air driven blades of the rotor; and generating the energy at the electric generator.

Item 34: The method of any preceding item, wherein directing the airflow through the flow consolidating conduit of the wind turbine system comprises partitioning the airflow using a plurality of flow partitions that subdivide the cross-sectional area of the flow consolidating conduit into three or more flow paths, the three or more flow paths gradually merging into a single flow path so that the airflow exits the flow consolidating conduit as the consolidated airflow.

Item 35: The method of any preceding item, wherein the plurality of air driven blades have a radially inward discharge direction.

Item 36: The method of any preceding item, further comprising discharging airflow from the rotor in an axial discharge direction that is substantially parallel to a rotation axis of the rotor.

Item 37: The method of any preceding item, wherein the rotor has multiple air redirecting blades located radially inward of the air driven blades to discharge the airflow from the rotor.

Item 38: The method of any preceding item, wherein the air redirecting blades have a herringbone shape.

Item 39: The method of any preceding item, wherein the passage cross-sectional area decreases continually from the recirculation passage upstream end to the recirculation passage downstream end.

The invention claimed is:

1. A wind turbine system comprising:
a flow consolidating conduit that extends from an airflow capture inlet to a consolidating conduit downstream end; and
an air driven rotor assembly having a rotor assembly upstream end located downstream of the consolidating conduit downstream end, the air driven rotor assembly comprising:
a rotor housing;
a rotor within the rotor housing, the rotor having a plurality of air driven blades distributed around a rotor rotation axis and multiple air redirecting blades located radially inward of the air driven blades, the rotor having a radially inward entry direction, and each air redirecting blade:
being circumferentially spaced apart from each other air redirecting blade of the multiple air redirecting blades, and
extending radially outward of the rotation axis to a radially outermost blade tip, the blade tip extending axially and having a first tip portion connected to an axially adjacent second tip portion, the first and second tip portions being angled relative to the axis of rotation so that the blade tip has a V-shape; and
an annular pre-rotor flow recirculation passage defined between the rotor housing and the rotor,
the recirculation passage surrounding the rotor,
the recirculation passage extending from a recirculation passage upstream end to a recirculation passage downstream end,
the recirculation passage downstream end being open ended and providing fluid continuity from the recirculation passage downstream end to the recirculation passage upstream end,
the recirculation passage having a passage cross-sectional area that decreases gradually from the recirculation passage upstream end to the recirculation passage downstream end.

2. The wind turbine system of claim 1, wherein the plurality of air driven blades have a radially inward discharge direction.

3. The wind turbine system of claim 1, wherein the air redirecting blades have an axial discharge direction that is substantially parallel to the rotation axis.

4. The wind turbine system of claim 1, wherein the air redirecting blades have a herringbone shape.

5. The wind turbine system of claim 1, wherein the passage cross-sectional area decreases continually from the recirculation passage upstream end to the recirculation passage downstream end.

6. The wind turbine system of claim 1, wherein a plurality of flow partitions subdivide a cross-sectional area of the flow consolidating conduit into three or more flow paths, the three or more flow paths gradually merging into a single flow path at the consolidating conduit downstream end.

7. The wind turbine system of claim 1, further comprising an electric generator, the electric generator being connected to the air driven rotor.

8. The wind turbine system of claim 1, further comprising a wind turbine housing that encloses the flow consolidating conduit and the air driven rotor assembly.

9. The wind turbine system of claim 8, wherein at least a portion of an outer surface of the wind turbine housing is a dimpled surface.

10. The wind turbine system of claim 1, further comprising an outlet conduit in fluid connection with the rotor to discharge airflow from the rotor out of the wind turbine system.

11. A building comprising the wind turbine system of claim 1.

12. A method of generating energy in a wind turbine system, the method comprising:
- capturing wind as airflow in an airflow capture inlet of the wind turbine system;
- directing the airflow through a flow consolidating conduit of the wind turbine system to provide a consolidated airflow to an air driven rotor of the wind turbine system;
- directing the consolidated airflow through an open-ended and annular pre-rotor flow recirculation passage that surrounds the rotor and directs airflow radially inward towards air driven blades distributed around a rotor rotation axis of the rotor, the pre-rotor flow recirculation passage having a passage cross-sectional area that decreases gradually from a recirculation passage upstream end to a recirculation passage downstream end, wherein the rotor has multiple air redirecting blades located radially inward of the air driven blades, each air redirecting blade:
- being circumferentially spaced apart from each other air redirecting blade of the multiple air redirecting blades, and
- extending radially outward of the rotation axis to a radially outermost blade tip, the blade tip extending axially and having a first tip portion connected to an axially adjacent second tip portion, the first and second tip portions being angled relative to the axis of rotation so that the blade tip has a V-shape;
- driving an electric generator using the air driven blades of the rotor; and
- generating the energy at the electric generator.

13. The method of claim 12, wherein directing the airflow through the flow consolidating conduit of the wind turbine system comprises partitioning the airflow using a plurality of flow partitions that subdivide the cross-sectional area of the flow consolidating conduit into three or more flow paths, the three or more flow paths gradually merging into a single flow path so that the airflow exits the flow consolidating conduit as the consolidated airflow.

14. The method of claim 12, wherein the plurality of air driven blades have a radially inward discharge direction.

15. The method of claim 14, further comprising discharging airflow from the rotor in an axial discharge direction that is substantially parallel to the rotation axis of the rotor.

16. The method of claim 12, wherein the air redirecting blades have a herringbone shape.

17. The method of claim 12, wherein the passage cross-sectional area decreases continually from the recirculation passage upstream end to the recirculation passage downstream end.

* * * * *